(12) United States Patent
Steimel et al.

(10) Patent No.: US 7,141,174 B2
(45) Date of Patent: *Nov. 28, 2006

(54) MODIFIED AMINE FOR BOILER WATER TREATMENT

(75) Inventors: Lyle H. Steimel, Forest Park, OH (US); James Emerson, Cincinnati, OH (US); Sue Ann Balow, Maineville, OH (US)

(73) Assignee: JohnsonDiversey, Inc., Sturtevant, WI (US)

( * ) Notice: Subject to any disclaimer, the term of this patent is extended or adjusted under 35 U.S.C. 154(b) by 191 days.

This patent is subject to a terminal disclaimer.

(21) Appl. No.: 10/947,509

(22) Filed: Sep. 22, 2004

(65) Prior Publication Data

US 2005/0035328 A1    Feb. 17, 2005

Related U.S. Application Data

(62) Division of application No. 10/231,554, filed on Aug. 30, 2002, now Pat. No. 6,797,197.

(51) Int. Cl.
| | | |
|---|---|---|
| *C02F 1/66* | (2006.01) | |
| *C02F 1/70* | (2006.01) | |
| *C02F 1/68* | (2006.01) | |
| *C02F 1/52* | (2006.01) | |
| *B01D 21/00* | (2006.01) | |

(52) U.S. Cl. .................. 210/700; 210/698; 252/188.28; 252/81; 252/400.22; 252/389.22; 252/402; 252/391

(58) Field of Classification Search ..................... None
See application file for complete search history.

(56) References Cited

U.S. PATENT DOCUMENTS

| | | | | |
|---|---|---|---|---|
| 2,580,923 A * | 1/1952 | Jacoby | ......................... | 422/11 |
| 2,917,528 A | 12/1959 | Ramsey et al. | ............. | 260/438 |
| 3,336,221 A | 8/1967 | Ralston | ...................... | 210/58 |
| 3,477,956 A | 11/1969 | Stanford et al. | ............. | 252/855 |
| 3,528,502 A | 9/1970 | Oleen | ........................ | 166/275 |
| 3,743,603 A * | 7/1973 | Redmore | .................... | 252/180 |
| 3,816,518 A * | 6/1974 | Kerst | .......................... | 562/13 |
| 3,932,303 A | 1/1976 | Hollingshad | ................ | 252/389 |
| 4,030,927 A | 6/1977 | Tani | ............................ | 96/100 |
| 4,066,398 A | 1/1978 | Hwa | ......................... | 21/2.7 A |
| 4,108,663 A | 8/1978 | Tanaka et al. | .................. | 96/74 |
| 4,120,655 A | 10/1978 | Crambes et al. | .............. | 422/15 |
| 4,171,975 A | 10/1979 | Kato et al. | ..................... | 96/100 |
| 4,246,333 A | 1/1981 | Fuseya et al. | ............... | 430/219 |
| 4,497,713 A * | 2/1985 | Geiger | ........................ | 210/699 |
| 4,556,493 A | 12/1985 | Cuisia | ........................ | 210/699 |
| 4,874,541 A | 10/1989 | Steimel et al. | ............... | 252/178 |
| 4,891,141 A | 1/1990 | Christensen et al. | ......... | 210/750 |
| 4,973,744 A * | 11/1990 | Hwa et al. | ..................... | 562/12 |
| 5,135,661 A | 8/1992 | Patel | .......................... | 210/698 |
| 5,259,974 A | 11/1993 | Chen et al. | .................. | 210/700 |
| 5,358,642 A * | 10/1994 | Chen et al. | .................. | 210/700 |
| 5,424,032 A | 6/1995 | Christensen et al. | .......... | 422/14 |
| 5,800,732 A * | 9/1998 | Coughlin et al. | ............ | 252/180 |
| 5,961,845 A | 10/1999 | List et al. | ..................... | 422/13 |
| 6,365,101 B1 | 4/2002 | Nguyen et al. | ............... | 422/13 |
| 6,846,419 B1 * | 1/2005 | Steimel et al. | ............... | 210/700 |

FOREIGN PATENT DOCUMENTS

| | | |
|---|---|---|
| EP | 0218798 | 4/1987 |
| EP | 0321066 | 6/1989 |

* cited by examiner

*Primary Examiner*—Joseph D. Anthony
(74) *Attorney, Agent, or Firm*—Wood, Herron & Evans, L.L.P.

(57) ABSTRACT

The present invention provides a method of treating boiler and condensate water by the addition of an effective amount of a hydroxyamine-acid ester treatment reagent or an all-in-one treatment composition comprising a hydroxyamine-acid ester. Modification of a hydroxyamine to a hydroxyamine-acid ester generally reduces the odors of the amine while providing a means to formulate the composition into a solid form. The ester typically decomposes at conditions in the boiler to release the hydroxyamine to treat the boiler water. Other components used to treat boiler water and condensate related problems may be formulated with the hydroxyamine-acid ester to form the all-in-one treatment composition.

15 Claims, No Drawings

MODIFIED AMINE FOR BOILER WATER TREATMENT

This application is a divisional of Ser. No. 10/231,554, filed Aug. 30, 2002, U.S. Pat. No. 6,797,197 to issue Sep. 28, 2004 entitled "Modified Amine For Boiler Water Treatments".

FIELD OF THE INVENTION

The invention relates to a method and composition to treat boiler water. More particularly, the invention relates to a method of treating boiler water by adding a composition comprising an ester of a hydroxy amine and an acid in an amount effective to treat boiler water and related condensate.

BACKGROUND OF THE INVENTION

A boiler requires extremely pure water in order to avoid a plurality of different problems. Unfortunately, water coming into most boilers is not pure enough to avoid these problems. Impurities in the water, including gases such as oxygen and carbon dioxide, would rapidly contaminate the water and damage the boiler.

In addition, condensed steam, referred to as condensate, generated in the boiler and accompanying boiler lines, is a major source of impurities. Condensate generally traps impurities, especially gases including oxygen and carbon dioxide, from the air and becomes contaminated. The contaminated condensate inevitably reenters the pool of boiler water, thereby further contaminating the boiler water. Other problems including accumulation of scale, maintenance of pH, boiler pitting by oxygen, and the generation of carbonic acid in the water may occur as a result of contaminated boiler water. Therefore, the contaminants must be removed or treated.

Currently there are a variety of different physical and chemical treatments for contaminated boiler water. Conventional treatments have included the use of amines, particularly to scavenge oxygen and neutralize carbon dioxide. These amines are generally volatile, having boiling points comparable to elevated temperatures in the boiler, and vaporize into the steam to treat the resulting condensate.

Amines which have been used treat boiler water include octadecylamine, typically used as a filming amine, and diethylaminoethanol which has also been used to treat condensate systems. However, these amines, as well as other conventional amines commonly used as boiler water treatment agents, typically are commercially available only as liquids. In addition, the prior art boiler water treatment compositions containing amines were prepared and stored as liquids. As with most liquid amines, these compositions generally emit repugnant and potentially toxic odors which may be detected during manufacture, packaging, or shipping processes, and particularly during the use in treating boiler water. In addition, prolonged storage of liquid amines generally allows the vapor pressure to build exposing the user to serious noxious odors and unhealthy levels of vapors. Such amines and corresponding compositions, therefore, pose possible health and safety risks to the user and are likely to affect any person involved with the processing of such boiler treatment agents who may be exposed to the odors and vapors. Therefore, there exists a need to relieve the odor generated by liquid amine boiler water treatment compositions. There also remains a need to improve the formulation of the amine used to treat boiler water and to improve the ease and comfort by which the amine may be used to treat boiler water.

SUMMARY OF THE INVENTION

The present invention reduces or eliminates amine odors and corresponding safety risks by providing a method and composition to treat boiler water by adding an effective amount of an amine which has been modified in form. Modified amines, such as an ester of a hydroxyamine, provide effective treatment of boiler water systems without exposure of the user or processor to repugnant amine odors and vapors which may threaten health and safety. Modified amines generally provide a more convenient solid form in which the amine may be used to treat boiler water.

Esters of hydroxyamines may be formed by reacting a hydroxyamine, partially or fully, with an acid. For instance, an amino-phosphate or phosphonate ester may be formed by reacting a hydroxyamine with a phosphoric acid or phosphonic acid respectively. Similarly, amino-sulfate and amino-sulfonate esters may be formed by reacting a hydroxyamine with a sulfuric acid or a sulfonic acid respectively. The ester may have a hydroxyamine to acid mole ratio in the range of from about 1:1 to about 19:1, preferable greater than about 3:1. Such hydroxyamine-acid ester mixtures generally reduce or eliminate amine odors and allow the amine to be added to the boiler water in a solid form for convenience and comfort of use. Alternatively, the ester may be combined with other treatment agents which may be added in an effective amount to treat the boiler water.

Hydroxyamine-acid esters are effective as boiler water treatment agents because they generally decompose at elevated temperatures, such as boiling temperatures, at atmospheric pressures to a sufficient extent to release effective amounts of the individual components, i.e., a hydroxyamine and the corresponding acid. A variety of hydroxyamines, such as N,N-diethylaminoethanol, 2-amino-2-methyl-1-propanol, 1,1-dimethylamine-propanol, 2-dimethylamino-2-methyl-1-propanol, and core amines, such as cyclohexylamine, morpholine, octadecylamine, and N,N-dimethyl-1,3-propanediamine, modified to include terminal hydroxy groups may be used to form the ester to treat the boiler water.

The ester may be formulated into either a liquid or a solid, as desired, and added directly to treat the boiler water. Both the liquid and the solid formulations are generally free of odors and solid compositions may allow easier use and storage. The treatment composition can generally be provided at high concentrations for storage and application and is effective at concentrations determined by the user and dependent on the desired level of treatment.

The ester is generally formulated with at least one other component to form a final treatment composition to effectively treat boiler water. For instance, the composition may include additional oxygen scavenging agents, alkalinity control agents, hardness reducing agents, and iron controlling agents. If the desired treatment composition is to be formulated as a solid, such as a dry powder, then each of the other components are generally mixed in a dry form with the hydroxyamine-acid ester. Effective quantities of each component may be determined by the user depending upon the type and level of contamination and desired treatment concentration. The boiler water treatment composition may generally be stored and applied at high concentrations or pre-mixed dilutions which may be added at effective concentrations determined by the user.

The present invention will be further appreciated in light of the following detailed description.

DETAILED DESCRIPTION OF THE INVENTION

The present invention provides a method of treating boiler water comprising the addition, to the boiler water, of an effective amount of hydroxyamine reactant to form an ester. This may be combined with an oxygen scavenging agent, an alkalinity control agent, a hardness reducing agent or an iron controlling agent.

Suitable esters include phosphate esters, phosphonate esters, sulfate esters, and sulfonate esters. The amine-ester modification, a reaction between a hydroxyamine and an acid, typically renders an otherwise potentially pungent amine more convenient and safe. For example, a phosphate ester of an amine is generally odorless and has increased viscosity permitting formulation and packaging of the amino-phosphate ester treatment reagent as a solid.

The amine is a hydroxyamine which is modified to form the ester. The term 'modification', as used herein, refers to a reaction of a hydroxyamine with an acid to form the corresponding ester. The term 'hydroxyamine', as used herein, refers to any primary, secondary or tertiary amine core molecule bearing a pendant hydroxyl functional group capable of reacting with an acid to form an ester. Hydroxyamines, suitable for use in the present invention, may be commercially available from vendors, such as Aldrich Chemical Company, or privately synthesized as desired to optimize physical and degradative properties of the hydroxyamine-acid ester.

Hydroxyamines can be synthesized by modifying an amine core molecule to attach the requisite terminal hydroxyl group. Conventional methods to incorporate a hydroxyl terminus including conversion of a terminal functional group to a hydroxyl group may be used. Such methods are disclosed in *Advanced Organic Chemistry*, 4$^{th}$ Ed. authored by Jerry March, published in 1992. Amine cores suitable for use in the present invention include octadecylamine, cyclohexylamine, morpholine, and N,N-dimethyl-1,3-propandiamine. Core amines which have typically been used to treat boiler water are generally available commercially as FDA approved liquids.

Hydroxyamines, suitable for the present invention, have the general formula: $HO—(CR^1R^2)_n—N—R^3R^4$ wherein $R^1$, $R^2$, $R^3$, and $R^4$, at each occurrence, is independently selected from the group consisting of H, alkyl, cycloalkyl, aryl, and heteroaryl organic substitutions having up to 10 atoms selected from C, N, or O. Substitutions $R^1$, $R^2$, $R^3$, and $R^4$, of the general formula above, refer to organic structures covalently extending from a carbon or nitrogen atom on the hydroxyamine. The term 'alkyl', as used herein, generally refers to a straight or branched hydrocarbon chain of varying length or number of atoms, such as from 1 to 10 atoms. The term 'cyclo alkyl', as used herein, refers to an unsaturated cyclic ring comprising carbon, nitrogen, or oxygen atoms in the ring. The term 'aryl', as used herein, refers to an aromatic ring consisting of carbon atoms, and the term, 'heteroaryl', as used herein refers to aromatic rings having heteroatoms, including nitrogen and oxygen. In addition, these substitutions may bear other functional groups, such as ethers or amines, which do not participate in the ester formation.

The spacer, $—(CR^1R^2)_n—$, between the hydroxyl group and the amine nitrogen atom, may vary in length, having 'n' atoms ranging from as small as a zero atoms to as long as 10 atoms. The preferred length is rather small, from 0 to 6 atoms. For example, one embodiment utilizes 2-amino-2-methyl-1-propanol which has a spacer of 2 carbon atoms, with each of $R^1$ and $R^2$ being a methyl group respectively. Also, ammonium hydroxide, having a 0 atom spacer, is a suitable hydroxamine for use in the present invention.

Alternatively, two substitutions may be attached to form rings. For instance, $R^3$, and $R^4$ substitutions, attached to the hydroxyamine nitrogen, may be joined to form a 5 or 6 membered carbocycle containing 0–2 additional heteroatoms including nitrogen and oxygen. For example, cyclohexylamine and morpholine are cyclic amine cores which may be modified to attach a terminal hydroxyl group from the amine nitrogen atom. Optionally, $R^1$, and $R^2$, independently, may be attached to $R^3$, or $R^4$, independently, to form a 5 or 6 membered carbocyclic ring containing 0–2 heteroatoms selected from nitrogen and oxygen. For example, a terminal hydroxyl group may extend from the C3 carbon atom of a cyclohexylamine core, thus resulting a ring from the third carbon atom in the spacer to the nitrogen atom on the hydroxyamine. Suitable hydroxyamines for use in the present invention include N,N-diethylethanolamine, 2-amino-2-methyl-1-propanol, 1,1-dimethylamine-propanol, and 2-dimethylamino-2-methyl-1-propanol as well as hydroxy modified amines including hydroxy-modified octadecylamine, hydroxy-modified cyclohexylamine, hydroxy-modified morpholine, and hydroxy-modified N,N-dimethyl-1,3-propanediamine.

A variety of acids, including phosphoric acid, phosphonic acids, sulfuric acid, sulfonic acids, carboxylic acids, and the like may be used to form the hydroxyamine-acid ester. For instance, a phosphoric acid, the general formula $(OR)_2—P(O)OH$, may be reacted with a hydroxyamine to form an amino-phosphate ester or an amino-phosphonate ester. Similarly, a hydroxyamine may be reacted with a sulfuric acid or a sulfonic acid, of the general formula $(OR)S(O)_2OH$, to form an amino-sulfate ester or an amino-sulfonate ester respectively. The R groups, independently, may be H, alkyl, cycloalkyl, aryl or heteroaryl organic structures having up to 10 atom selected from carbon, nitrogen or oxygen. For example, substituted phosphoric acids, referred to as phosphonic acids, such as aminotri(methylene phosphonic acid), 1-hydroxyethylidene-1,1-diphosphonic acid (HEDP), and 1,2,4-tricarboxylic acid-butane-2-phosphonic acid are suitable for the present invention. The acids may be commercially available or privately prepared and used to modify the hydroxyamine for use in treating boiler water.

Preparation of the hydroxyamine-acid ester may be accomplished by conventional synthetic methods and generally follow similar pathways. For example, the preparation of amino-phosphate esters are described in U.S. Pat. Nos. 3,477,956 and 3,528,502. Phosphate esters and phosphonate esters of amines have traditionally been synthesized through the use of a catalyst, such as phosphorus pentoxide or other similar catalysts. For example, typical synthesis have followed the following reaction pathway:

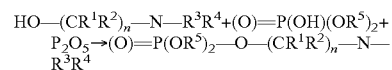

where each $R^5$, independently, may be an H as in phosphoric acid or a substitution, such as an alkyl group discussed earlier, of a phosphonic acid. The catalyst accelerates the ester bond formation. The reaction is exothermic in nature and together with the use of a catalyst, therefore, requires careful control of the ester formation.

Amino-phosphate esters used in the present invention may also be prepared without use of a catalyst. The hydroxyamine is mixed with a phosphoric acid without the addition of a catalyst. The reaction pathway follows the general formula:

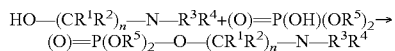
HO—(CR$^1$R$^2$)$_n$—N—R$^3$R$^4$+(O)=P(OH)(OR$^5$)$_2$→
(O)=P(OR$^5$)$_2$—O—(CR$^1$R$^2$)$_n$—N—R$^3$R$^4$ Generally, mixing may comprise adding the hydroxyamine to the phosphoric acid or vice versa, with the former being preferred. Typically, the heat generated from the exothermal contact of the amine with polyphosphoric acid is sufficient to form the ester linkage. The resulting amino-phosphate ester is generally vigorously stirred to effect the ester formation. Times required to form the ester may vary depending upon the desired mole ratio of the final composition and consequently the weight percentages of the hydroxyamine and phosphate respectively. Generally, upon cooling the resulting mixture or slurry is a viscous liquid. Conventional techniques may then be used to formulate the amino-phosphate ester for use in the present invention.

Similarly, sulfate esters and sulfonate esters may be formed by the same reaction mechanism. Generally, sulfonate esters are formed by the following reaction pathway:

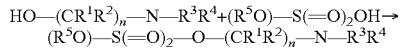
HO—(CR$^1$R$^2$)$_n$—N—R$^3$R$^4$+(R$^5$O)—S(=O)$_2$OH→
(R$^5$O)—S(=O)$_2$—O—(CR$^1$R$^2$)$_n$—N—R$^3$R$^4$ where R$^5$ may be an H as in sulfuric acid or a substitution, such as an alkyl group discussed earlier, of a sulfonic acid. Generally, the hydroxyamine is mixed with a sulfuric acid or a sulfonic acid and vigorously stirred. The reaction may not be as exothermic in nature as the phosphate ester reaction and a catalyst or heat, to accelerate the ester bond formation, may be required. Times required to form the resulting amino-sulfate or amino sulfonate ester may vary depending upon the desired mole ratio of the final composition and consequently the weight percentages of the hydroxyamine and sulfuric acid or sulfonic acid respectively. Generally, upon cooling the resulting mixture or slurry is a viscous liquid. Preparation of sulfate esters and sulfonate esters is further described in *Advanced Organic Chemistry*, 4$^{th}$ Ed. 1992. Conventional techniques may then be used to formulate the amino-sulfate ester or amino-sulfonate ester for use in the present invention.

The hydroxyamine-acid ester may be a mixture generally containing varying molar ratios of the hydroxyamine to the acid. Suitable hydroxyamine-acid ester compositions may include hydroxyamine to acid mole ratios as high as about 19:1. For example, the hydroxyamine-acid ester may be synthesized by reacting the hydroxyamine in 95 mole percent with a substituted or unsubstituted acid, such as phosphoric acid, in about 5.0 mole percent, to form the hydroxyamine-acid ester mixture having a hydroxy-amine to acid mole ratio of about 19:1. Similarly, the hydroxyamine-acid ester may be synthesized by reacting the hydroxyamine with an acid in equal stoichiometric amounts, or excess acid, to synthesize a fully esterified hydroxyamine-acid ester mixture having an amine to acid mole ratio of about 1:1. Amine odor is reduced significantly as the mole percent of the hydroxyamine modified to the corresponding hydroxyamine-acid ester increases. Optimally, a treatment composition comprising the hydroxyamine-acid ester in a hydroxyamine to acid mole ratio of about 3:1 has virtually no odor and is sufficiently viscous to be mixed with dry components to form a solid treatment composition.

The hydroxyamine-acid ester composition is effective in treating boiler water due to its degradative properties. At boiling temperatures and atmospheric or higher pressures, the hydroxyamine-acid ester typically breaks down to it's individual components. The basicity of the treated boiler water, coupled with hydroxide which may be introduced into the boiler water by the treatment composition, contributes to the hydrolysis of the hydroxyamine-acid ester to the corresponding hydroxyamine and component acid.

The hydroxyamine-acid ester is preferably added to the boiler water to result in a hydroxyamine concentration range from 1–200 parts per million in the boiler water and a hydroxyamine concentration range from 1–200 ppm in the steam. The hydroxyamine released into the boiler water generally serves to neutralize carbonic acid and scavenge oxygen in the boiler water and the corresponding steam. In addition, the degraded component acid, such as a phosphonic acid, and even the amine-carbonic acid salt, is generally available to assist in hardness control by metal chelation and metal transport in the steam boiler.

The composition may generally be formulated and stored either as a concentrated aqueous solution or as a solid powder. The composition may be added to the boiler water directly or as a solution, by pre-mixing the liquid or solid with water into a desired concentration, to effect a desired concentration and desired treatment effect of the boiler water.

All-in-one treatment compositions may be formulated with the hydroxyamine-acid ester by the addition of concentrated forms of multiple components at relative concentrations to allow the formulated treatment composition to be dispensed into boiler water and attain the desired use concentrations. The components and the actual amount of each component added to the concentrated formulation generally depends on, among other factors, the precise intended use concentrations and the concentration of each component as purchased. It will be further appreciated that other carbon dioxide neutralizing agents may also be added to form the composition. Examples of additional components which may be used to formulate the boiler water treatment composition of the present invention are disclosed and described in U.S. Pat. No. 4,874,541, and discussed in greater detail below.

Oxygen scavenging agents are used to scavenge oxygen, present in the boiler water, to prevent oxygen catalyzed pitting on the walls and lines in contact with the boiler water. In addition to the hydroxyamine-acid ester, other oxygen scavengers conventionally known in the art, may be formulated with the hydroxyamine-acid ester to form a treatment composition to be added to the boiler water. For example, sulfites such as sodium or potassium sulfite and polyhydroxy acids such as ascorbic acid and erythorbic acid may be used in the composition. The amount of the oxygen scavenging agent used may vary in accordance with the desired level of treatment and the amount of oxygen present in the water. The sulfites, used in the present invention, may generally be effective if added in the range of about 20 to about 250 parts per million (ppm) or formulated in the range of 0.1 to 60% by weight of the composition, while the polyhydroxy acid, may generally be effective if added in the range of about 1 to about 40 ppm or formulated in the range of about 0.1 to about 5% by weight of the final composition.

An alkalinity control agent may be added to the composition to control the pH, generally a basic pH, in the boiler water. Conventional alkalinity control agents are suitable for the present invention including carbonates such as sodium and potassium carbonate, hydroxides such as ammonium, sodium, or potassium hydroxide, and amines including various primary, secondary, or tertiary amines capable of maintaining a basic pH in the water. The specific amount of the alkalinity control agent used may vary, and is determined by the user in accordance with factors including water volume, other acidic or basic components in the water or the composition, and desired level of treatment. Useful composition formulations having alkalinity control agents are generally in the range of 0–70% carbonate and 0–40% hydroxide, by weight of the composition, as needed to maintain a basic pH in the boiler water. The amine, such as the hydroxyamines of the present invention, may effectively scavenge oxygen and maintain a condensate pH in the range of 7.5 to 8.5, if generally used in a concentration of about 1–200 ppm, preferably in the range of about 25 to about 100 ppm, or formulated in a range of about 0.01–50% by weight of the final treatment composition.

The hardness reducing agents or hydrating compositions include conventional hardness reducing agents such as carbonates, including sodium and potassium carbonate, as well as different types of polymers. Carbonates are typically effective if used in a concentration of about 20 to about 500 ppm per volume of boiler water. The polymers, conventionally used to treat hardness in water, include polyacrylates, such as polymethacrylates, in a molecular weight range of 500–5000 with the upper molecular weights, generally around 3000–5000, being preferred. Polyacrylates may generally be utilized in an amount desired by the user, however, 1–80 ppm is generally effective, with 12–24 ppm being preferred. In addition, other polymers such as polymaleates, generated from polymaleic acid, may also be used to treat hardness. The polymaleates, used in the present invention, generally will have a molecular weight between 500–1000 with 750 being preferred. In addition, the polymaleates may generally be effective if used at a concentration in the range of 1–80 ppm. The polyacrylates and polymaleates, used in the present invention, will generally be effective if formulated in the treatment composition in the range of 0.01% to about 10% by weight of the composition.

In addition to the hydroxyamine-acid ester and other components, the treatment composition may further comprise an iron controlling agent to control the level of iron in the boiler water. Conventional agents capable of controlling iron levels in the boiler water are suitable for the present invention. Generally, iron controlling agents such as glucoheptonate, i.e., the sodium or potassium salt thereof, is suitable for the present invention. Glucoheptonate may be effectively used in a boiler water concentration range of from about 0 to about 10 ppm or formulated into a treatment composition in a range of from about 0–2% by weight of the composition.

A preferred formulation includes a glucoheptonate, such as sodium glucoheptonate, present in the composition in a range of from about 0–2% by weight, a sulfite such as sodium sulfite, present in the composition in a range of from about 0.1% to about 60% by weight, a polyhydroxy acid, such as ascorbic acid, present in the composition in a range of from about 0.1% to about 5% by weight, an amino phosphate ester, such as N,N-diethylaminoethanol-phosphate ester, present in the composition in a range of from about 0.1–about 50% by weight, a polymer, such as a sodium polymethacrylate having a molecular weight between 500–5000 and present in the composition in a range of from about 0.1%–about 10% by weight, a polymaleate composed of maleic acid having a molecular weight between 500–5000 and present in the composition in a range of from about 0.1%–about 10% by weight, a carbonate, such as sodium carbonate, present in the composition in a range of from about 0%–about 20% by weight, and a water soluble base, such as sodium hydroxide, present in the composition in a range of from about 0%–about 40% by weight, with the remaining weight percent composed of water. An amount of the treatment composition, effective to treat targeted impurities and to satisfactorily purify the boiler water, may be added to the boiler. Generally, about 1000–2000 ppm of the all-in-one treatment composition is sufficient to treat boilers operating at pressures below 250 psi, and the composition is dispensed periodically into the boiler to maintain this concentration in the boiler water.

Optimal treatment will generally occur with the addition of a composition comprising sodium glucoheptonate in about 2.64% by weight, sodium sulfite in about 27.5% by weight, ascorbic acid in about 2.24% by weight, diethylaminoethanol-HEDP ester in about 16.9% by weight, sodium polymethacrylate in about 5.3% by weight, sodium polymaleate in about 5.54% by weight, sodium hydroxide in about 3.87% by weight, sodium tripolyphosphate in about 1.25% by weight of the composition, and the remaining as water, in a conventional boiler operating at normal boiler temperatures and pressures below 250 psi.

Accordingly, the present invention provides for a method of treating boiler water by adding an effective amount of a hydroxyamine-acid ester having a hydroxyamine to acid mole ratio of at least 1:1. The hydroxyamine-acid ester may be applied as a concentrated liquid, a dry powder, or as one of many components in a composition similarly formulated as a concentrated liquid or more preferably, as a solid, dry powdery form. The hydroxyamine-acid ester typically lacks the repugnant odor of the un-modified amine while allowing the amine treatment reagent to be applied and stored in a form more desirable, safe, and convenient. The hydroxyamine-acid ester breaks down into its individual components at boiling temperatures at atmospheric pressure. Therefore, treatment of boiler water with hydroxyamine-acid esters of the present invention is as effective as treatment with the amine reagent itself.

While the present invention has been illustrated by a description of various embodiments, and while these embodiments have been described in detail, it is not the intention of the applicants to restrict or in any way limit the scope of the appended claims to such detail. Additional advantages and modifications will readily appear to those skilled in the art. Therefore, the invention in its broader aspects is not limited to the specific details and representative methods as shown and described. Accordingly, it is apparent that certain modifications or alterations can be made without departing from the spirit or scope of the inventor set forth in the appended claims.

What is claimed is:

1. A method of treating boiler water comprising the addition of a composition including:
   an ester of a hydroxyamine and a phosphonic acid to water in said boiler water.

2. The method of claim 1 wherein said phosphonic acid has the general formula $(OR)_2$—P(O)OH, wherein R independently is selected from the group consisting of H, alkyl, cycloalkyl, aryl, and heteroaryl organic structures having up to 10 atoms.

3. The method claimed in claim 1 wherein the ester is formed from:
   a hydroxyamine having the general formula HO—$(CR^1R^2)_n$—N—$R^3R^4$ wherein $R^1$, $R^2$, $R^3$, and $R^4$, at each occurrence, is independently selected from the group consisting of H, alkyl, cycloalkyl, aryl, and heteroaryl organic structures having up to 10 atoms, and wherein R³ and R⁴ taken together with the nitrogen to which they are attached can form a 5 or 6 membered ring containing 0–2 additional heteroatoms selected from N or O, and wherein R¹ or R², independently, can be attached to R³ or R⁴ independently, to form a 5 or 6 membered ring containing 0–2 additional heteroatoms selected from N or O, and n is an integer from 0–10; and an acid selected from the group consisting of aminotri (methylene phosphonic acid), 1-hydroxyethylidene-1,1-diphosphonic acid, 1,2,4-tricarboxylic acid-butane-2-phosphonic acid and mixtures thereof.

4. The method claimed in claim 1 wherein the hydroxyamine is selected from the group consisting of hydroxy-modified cyclohexylamine, hydroxy-modified morpholine, hydroxy-modified octadecylamine, N, N-diethylethanolamine, 2-amino-2-methyl-1-propanol, 1,1-dimethylamine-propanol, 2-dimethylamino-2-methyl-1-propanol, hydroxy-modified N,N-dimethyl-1,3-propanediamine, and ammonium hydroxide.

5. The method claimed in claim 3 wherein the composition has a hydroxyamine to acid mole ratio in the range of from about 1:1 to about 3:1.

6. The method claimed in claim 1 further comprising an oxygen scavenging agent selected from the group consisting of sulfite and polyhydroxy acid,
wherein the polyhydroxy acid is selected from the group consisting of ascorbic acid and erythorbic acid.

7. The method claimed in claim 1 further comprising an alkalinity control agent selected from the group consisting of carbonate, hydroxide and amine.

8. The method claimed in claim 1 further comprising a hardness reducing agent selected from the group consisting of carbonate, polyacrylic acid, polymethacrylic acid, and salts thereof, and a polymaleate; and
a glucoheptonate.

9. The method claimed in claim 1 wherein the hydroxyamine is N, N-diethylethanolamine present in about 0.1% to about 50% by weight of the composition.

10. The method claimed in claim 1 wherein the ester is N,N-diethylaminoethanol-1-hydroxyethylene-1-phosphono-1-phosphonate ester present in about 0.1% to about 50% by weight of the composition.

11. The method claimed in claim 1 wherein the composition comprises by weight:
Glucoheptonate: 0% to 2.0%;
Sulfite: 0.1% to 60%;
Polyhydroxy acid: 0.1% to 5.0%;
said ester: 0.01% to 50%;
a polymer: 0.1% to 10%;
Polymaleate: 0.1% to 10%;
Carbonate: 0.0% to 20%;
alkali metal hydroxide: 0.0% to 40.0%, wherein
the sulfite is selected from the group consisting of sodium sulfite and potassium sulfite;
the polyhydroxy acid is selected from the group consisting of ascorbic acid and erythorbic acid;
wherein the hydroxyamine is selected from the group consisting of hydroxy-modified cyclohexylamine, hydroxy-modified morpholine, hydroxy-modified octadecylamine, N, N-diethylethanolamine, 2-amino-2-methyl-1-propanol, 1,1-dimethylamine-propanol, 2-dimethylamino-2-methyl-1-propanol, hydroxy-modified N,N-dimethyl-1,3-propanediamine, and ammomium hydroxide, and
the phosphonic acid is selected from the group consisting of aminotri(methylene phosphonic acid), 1-hydroxyethylidene-1,1-diphosphonic acid, and 1,2,4-tricarboxylic acid-butane-2-phosphonic acid, and wherein
the polymer is selected from the group consisting of polyacrylic acid, polymethacrylic acid, and salts thereof;
the polymaleate is polymaleic acid or the salt thereof; and
the carbonate is sodium carbonate or potassium carbonate.

12. The method claimed in claim 11 wherein the composition has a hydroxyamine to phosphonic acid mole ratio is in the range of from about 1:1 to about 3:1.

13. The method claimed in claim 11 wherein the ester is N,N-diethylaminoethanol-1-hydroxyethylene-1-phosphono-1-phosphonate ester present in about 0.1% to about 50% by weight of the composition.

14. The method claimed in claim 11 wherein the composition is a solid.

15. The method claimed in claim 1 wherein the composition comprises by weight:
Sodium Glucoheptonate: 0.01% to 5.0%;
Sodium sulfite: 1.0% to 30%;
Ascorbic acid: 0.1% to 5.0%;
Sodium polymethacrylate having a molecular weight between 500–5000: 1.0% to 10%;
N,N-diethylaminoethanol-1-hydroxyethylene-1-phosphono-1-phosphonate ester: 0.1% to 22.5%;
Maleic acid having a molecular weight between 500–1000: 0.1% to 5.0%;
Sodium carbonate: 0% to 20%;
Sodium hydroxide: 0% to 40%; and
Water: to 100%.

* * * * *